(12) United States Patent
Fuller et al.

(10) Patent No.: US 7,137,071 B2
(45) Date of Patent: Nov. 14, 2006

(54) SYSTEM AND METHOD FOR PROVIDING SUGGESTED GRAPHICAL PROGRAMMING OPERATIONS

(75) Inventors: David Fuller, Austin, TX (US); Sundeep Chandhoke, Austin, TX (US); Nicolas Vazquez, Austin, TX (US); Christopher Cifra, Austin, TX (US)

(73) Assignee: National Instruments Corporation, Austin, TX (US)

( * ) Notice: Subject to any disclaimer, the term of this patent is extended or adjusted under 35 U.S.C. 154(b) by 959 days.

(21) Appl. No.: 10/021,728

(22) Filed: Dec. 12, 2001

(65) Prior Publication Data

US 2003/0107599 A1    Jun. 12, 2003

(51) Int. Cl.
G06F 3/048     (2006.01)
G06F 9/44      (2006.01)
G06F 17/40     (2006.01)

(52) U.S. Cl. .............. 715/771; 715/967; 715/825; 715/811; 715/763; 715/809; 715/727; 715/708; 700/86; 700/87; 717/109; 717/110; 717/113

(58) Field of Classification Search .......... 345/763; 706/45; 700/86, 299, 83, 85, 87, 108; 715/762, 715/763, 967, 853, 835, 970, 809, 727, 978, 715/705, 708, 714, 764, 769, 771, 810, 811, 715/812, 825; 717/105, 109, 110, 111, 113, 717/116

See application file for complete search history.

(56) References Cited

U.S. PATENT DOCUMENTS 5,506,952 A * 4/1996 Choy et al. ............. 345/763
5,644,686 A * 7/1997 Hekmatpour .............. 706/45
5,784,275 A * 7/1998 Sojoodi et al. ........... 700/86
5,966,532 A   10/1999 McDonald et al.
6,064,409 A * 5/2000 Thomsen et al. ....... 715/970 X
6,351,693 B1 * 2/2002 Monie et al. ............ 700/299
6,784,902 B1 * 8/2004 Melder et al. ............ 715/771

* cited by examiner

*Primary Examiner*—Raymond J. Bayerl

(74) *Attorney, Agent, or Firm*—Meyertons Hood Kivlin Kowert & Goetzel, P.C.; Jeffrey C. Hood; Jason L. Burgess

(57) ABSTRACT

A system and method for enabling a graphical programming development environment to provide suggested graphical programming operations, such as suggested nodes or icons to include in a graphical program. User input specifying one or more nodes to include in the graphical program may be received. The one or more specified nodes may then be included in the graphical program. One or more suggested nodes to include in the graphical program may be then be automatically displayed or otherwise suggested to the user. The one or more suggested nodes may be based on the nodes already included in the graphical program. In various embodiments, the one or more suggested nodes may be displayed or otherwise suggested in various ways.

50 Claims, 6 Drawing Sheets

SYSTEM AND METHOD FOR PROVIDING SUGGESTED GRAPHICAL PROGRAMMING OPERATIONS

FIELD OF THE INVENTION

The present invention relates to the field of graphical programming, and more particularly to a system and method for providing suggested graphical programming operations, e.g., suggested nodes or icons to include in a graphical program.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures may be automatically constructed which characterize an execution procedure which corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program or VI, and may include other icons which represent devices being controlled. The front panel may be comprised in a single window of user interface elements, or may comprise a plurality of individual windows each having one or more user interface elements, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel may comprise front panel objects, e.g., the GUI, embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures and/or program instructions. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to users. Graphical programming environments such as the National Instruments LabVIEW product have become very popular. Tools such as LabVIEW have greatly increased the productivity of users, and increasing numbers of users are using graphical programming development environments to develop their software applications. In particular, graphical programming tools are being used for test and measurement, data acquisition, process control, man machine interface (MMI), supervisory control and data acquisition (SCADA) applications, simulation, image processing/machine vision applications, and motion control, among others.

It would be desirable to make graphical programming even more easy for the user by enabling a graphical programming development environment to provide suggested graphical programming operations, such as suggested nodes or icons to include in a graphical program, e.g., depending on nodes which the user has already included in the graphical program.

SUMMARY OF THE INVENTION

One embodiment of the present invention comprises a system and method for enabling a graphical programming development environment to provide suggested graphical programming operations, such as suggested nodes or icons to include in a graphical program. As used herein, the term "graphical program" is intended to include a program comprising graphical code, e.g., two or more interconnected nodes or icons, wherein the interconnected nodes or icons may visually indicate the functionality of the program. The nodes may be connected in one or more of a data flow, control flow, and/or execution flow format.

According to one embodiment of the method, user input specifying one or more nodes to include in the graphical program may be received. For example, the user may select the one or more nodes from a visual palette that displays a plurality of available nodes, the user may utilize menu, keyboard, or speech commands to include the one or more nodes, etc. The one or more specified nodes may then be included in the graphical program.

One or more suggested nodes to include in the graphical program may be then be automatically displayed or otherwise suggested to the user. The one or more suggested nodes may be based on the nodes already included in the graphical program. In various embodiments, the one or more suggested nodes may be displayed or otherwise suggested in any of various ways.

In one embodiment, the suggested node(s) may be displayed on a "suggestion palette". For example, the user may then include a suggested node in the graphical program by dragging the suggested node from the suggestion palette and dropping it into the graphical program. The graphical programming development environment may also provide other palettes for selecting nodes for inclusion in the graphical program. For example, all the available nodes may be organized on these other palettes according to their functionality, such as in the LabVIEW graphical programming development environment. The suggestion palette may be separate from these other palettes and may be easily accessible to the user. For example, in one embodiment the suggestion palette may always be displayed, allowing the user to immediately access the suggested node(s), whereas to access other palettes, the user may need to navigate through a hierarchy of palettes or may need to explicitly request display of the desired palette.

Any of various methods may be used in determining how many suggested node(s) are displayed on the suggestion palette and how long the nodes are displayed there. For example, in one embodiment, after the user has included a pre-determined number of additional nodes in the graphical program without selecting a suggested node, the suggested node may be removed from the suggestion palette. In another embodiment, after a predetermined time interval has elapsed without the user selecting a suggested node, the suggested node may be removed from the suggestion palette.

In one embodiment, suggested nodes may be cumulatively added to the suggestion palette. For example, in response to the user including a first node in the graphical program, a second node may be displayed on the suggestion palette. The user may then include a third node in the graphical program, and in response, a fourth node may be displayed on the suggestion palette, along with the second node. In another embodiment, the suggested nodes may not be cumulatively displayed, and the fourth node may replace the second node.

In alternative embodiments, the one or more suggested nodes may not be displayed on a suggestion palette, but may be otherwise displayed or indicated to the user. For example, in one embodiment, the suggested node(s) may appear as "shadow nodes" that follow the cursor. The user may then move the cursor to a desired position within the graphical program to drop the suggested node(s), e.g., by performing a mouse click or a keyboard command. If the user does not want to include the suggested node(s) in the graphical program, then the user may dismiss the shadow node(s) by performing a different mouse operation or a different keyboard command. The shadow node(s) may be displayed differently from how they normally appear, to indicate to the user that they are suggested nodes. For example, the shadow node(s) may be grayed out or displayed sem-transparently. Once the user drops the shadow node(s) in the graphical program, the node(s) may be displayed normally.

In various other embodiments, the suggested node(s) may be displayed in any of various other ways or may be indicated to the user using a technique other than display of the suggested node(s). For example, the user may receive audio suggestions indicating the suggested node(s) and may then perform a mouse or keyboard operation to include the suggested node(s) in the graphical program if desired. In another embodiment, the suggested node(s) may be automatically included in the graphical program, and the user may undo their inclusion if desired, e.g., by performing a mouse or keyboard operation.

In various embodiments, the one or more suggested nodes may be determined using any of various algorithms, heuristics, or other techniques. In one embodiment, a node to suggest in response to another node may be predetermined, and this behavior may be programmed into the graphical programming development environment. For example, consider a VISA Open node for opening a session to a device. Inclusion of a VISA Open node in a graphical program is almost always followed by inclusion of a VISA Close node, to close the device session opened by the VISA Open node. Thus, the graphical programming development environment may be programmed to always suggest a VISA Close node in response to inclusion of a VISA Open node. As similar examples, a Close File node may be suggested in response to an Open File node, a Close Registry Key may be suggested in response to an Open Registry Key node, etc. In other words, when a first node requires one or more additional nodes to complete or clean up an operation performed by the first node, the one or more additional nodes may be suggested in response to inclusion of the first node.

In another embodiment, the graphical programming development environment may use other algorithms or heuristics for determining suggested nodes, such as artificial intelligence or statistical techniques. For example, the graphical programming development environment may be operable to analyze existing graphical programs to determine which nodes typically occur together in programs. Also, the graphical programming development environment may be operable to interactively "learn" which nodes the particular user usually includes in a graphical program together, by tracking included nodes as the user develops multiple graphical programs over time. For example, the graphical programming development environment may determine that when the user includes a node to acquire data from a device, the user then typically includes a particular node to analyze the data and/or a particular node to display the data.

In another embodiment, the user may be able to specify desired suggestion behavior utilized by the graphical programming development environment. For example, the user may specify a pair of nodes that should always be present together. This may be useful, for example, for user-defined nodes, such as nodes representing sub-programs created by the user. Thus, the user may specify that when a first user-defined (or pre-defned) node has been included in a graphical program, a second user-defined (or pre-defned) node is automatically included or suggested.

In one embodiment, different methods for indicating the suggested nodes may be utilized, depending on the context of which node has been included. For example, consider a first pair of nodes, in which a first node always requires a second node to be present. In this case, in response to inclusion of the first node, the second node may appear as a shadow node. Now consider a second pair of nodes, in which a fourth node usually appears together in a graphical program with a third node. In this case, in response to inclusion of the third node, the fourth node may be displayed in a suggestion palette. It may be desirable to use the somewhat less-intrusive suggestion technique of displaying the fourth node in a suggestion palette, since it is not certain that the fourth node is required. In one embodiment, the user may be able to specify which suggestion method to use for which situations.

The techniques described above may also be applied to aid a user in developing other types of things besides graphical programs. For example, various prototyping environments or workshops allow a user to create a high-level algorithm or script, such as a prototyping environment for creating image processing scripts. Scripts may comprise a plurality of steps to perform a desired process. The steps may be represented graphically, e.g., as a plurality of icons, or textually, e.g., as a list. A method for suggesting steps for a script created using a prototyping environment or workshop application is described.

BRIEF DESCRIPTION OF THE DRAWINGS

A better understanding of the present invention can be obtained when the following detailed description of the preferred embodiment is considered in conjunction with the following drawings, in which.

Figure 1:
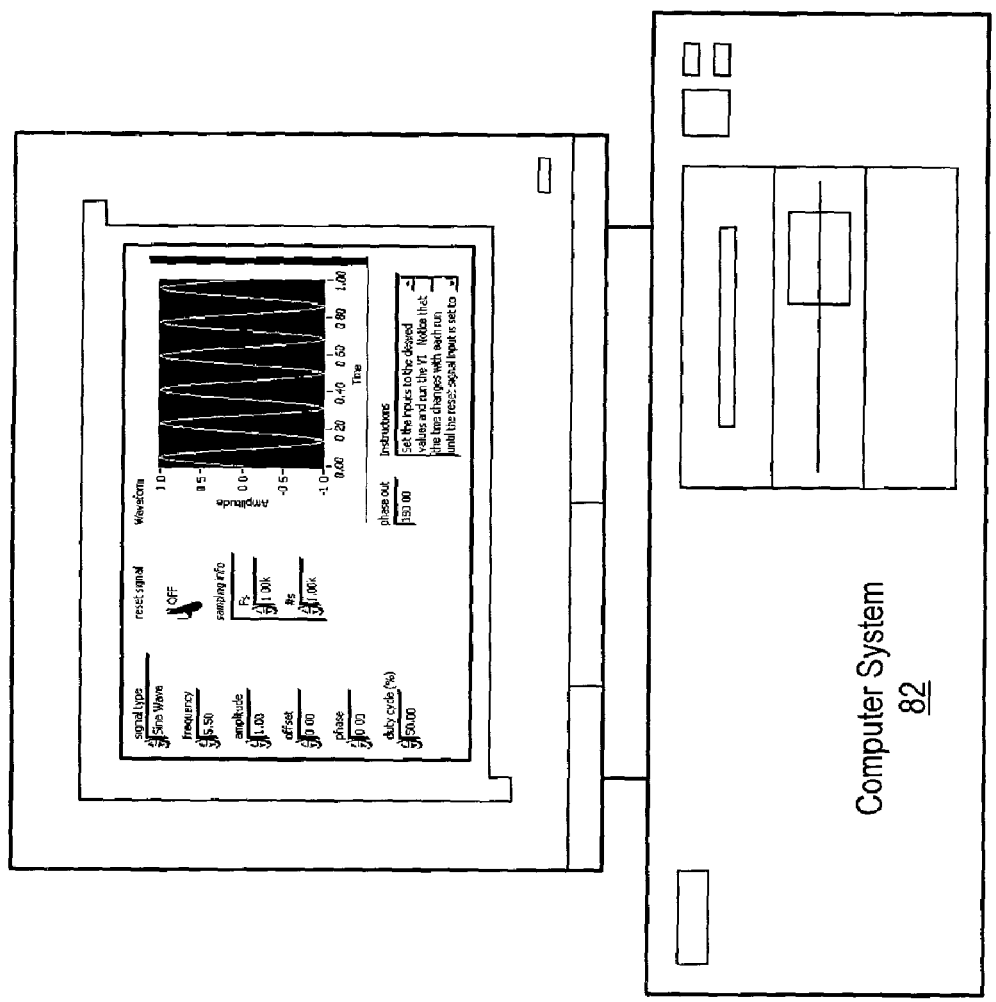
FIG. 1 illustrates a computer system operable to execute a graphical programming development environment operable to provide suggested graphical programming operations.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. patent application Ser. No. 09/587,682 titled "System and Method for Automatically Generating a Graphical Program to Perform an Image Processing Algorithm," filed Jun. 5, 2000, now U.S. Pat. No. 6,763,515.

U.S. Provisional Patent Application No. 60/301,799 titled "System and Method for Specifying a Machine Vision Process Using Different Programming Methodologies," filed Jun. 29, 2001, now U.S. Pat. No. 7,051,317.

The LabVIEW and BridgeVIEW graphical programming manuals, including the "G Programming Reference Manual", available from National Instruments Corporation, are also hereby incorporated by reference in their entirety.

FIG. 1—Computer System

FIG. 1 illustrates a computer system 82 operable to execute a graphical programming development environment application for creating graphical programs in response to user input. As described in detail below, the graphical programming development environment may be operable to assist the user in creating a graphical program by providing suggested graphical programming operations. In response to nodes or icons that the user has previously included in a graphical program, the graphical programming development environment may suggest additional nodes or icons to include in the graphical program. The suggested nodes or icons may be displayed such that the user can very easily include the suggested nodes or icons in the graphical program if desired, thus maximizing the efficiency for developing the graphical program.

The computer system 82 may be any type of computer system, including a personal computer system, mainframe computer system, workstation, network appliance, Internet appliance, personal digital assistant (PDA), television system or other device. In general, the term "computer system" can be broadly defined to encompass any device having at least one processor that executes instructions from a memory medium.

The computer system 82 may include a display device operable to display the graphical program as the graphical program is being created and/or executed. The display device may also be operable to display a graphical user interface or front panel of the graphical program during execution of the graphical program. FIG. 1 illustrates an exemplary graphical user interface or front panel for a graphical program.

The computer system 82 may include a memory medium(s) on which one or more computer programs or software components may be stored according to one embodiment of the present invention. For example, the memory medium may store a graphical programming development environment application (or portion of such an application) having functionality for suggesting graphical programming operations as described herein. Also, the memory medium may store one or more graphical programs created by such a graphical programming development environment. The memory medium may also store operating system software, as well as other software for operation of the computer system.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

In the present application, the term "graphical program" or "block diagram" is intended to include a program comprising graphical code, e.g., two or more interconnected nodes or icons, wherein the interconnected nodes or icons may visually indicate the functionality of the program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons which visually indicate the functionality of the program.

A graphical program may also comprise a graphical user interface or front panel. The user interface portion may be contained in the block diagram or may be contained in one or more separate panels or windows. The user interface of a graphical program may include various graphical user interface elements or front panel objects, such as user interface controls and/or indicators, that represent or display the respective input and/or output that will be used by the graphical program or VI, and may include other icons which represent devices being controlled. The user interface or front panel may be comprised in a single window of user interface elements, or may comprise a plurality of individual windows each having one or more user interface elements, wherein the individual windows may optionally be tiled together. As another example, the user interface or front panel may comprise user interface or front panel objects, e.g., the GUI, embedded in the block diagram. The user interface of a graphical program may display only output, only input, or both input and output. Further, in some embodiments the user interface or front panel of a graphical program may enable the user to interactively control or manipulate the input being provided to the graphical program.

Examples of graphical programming development environments that may be used to create graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others. In the preferred embodiment, the system described herein uses the LabVIEW graphical programming development environment available from National Instruments Corp.

Figure 2A:
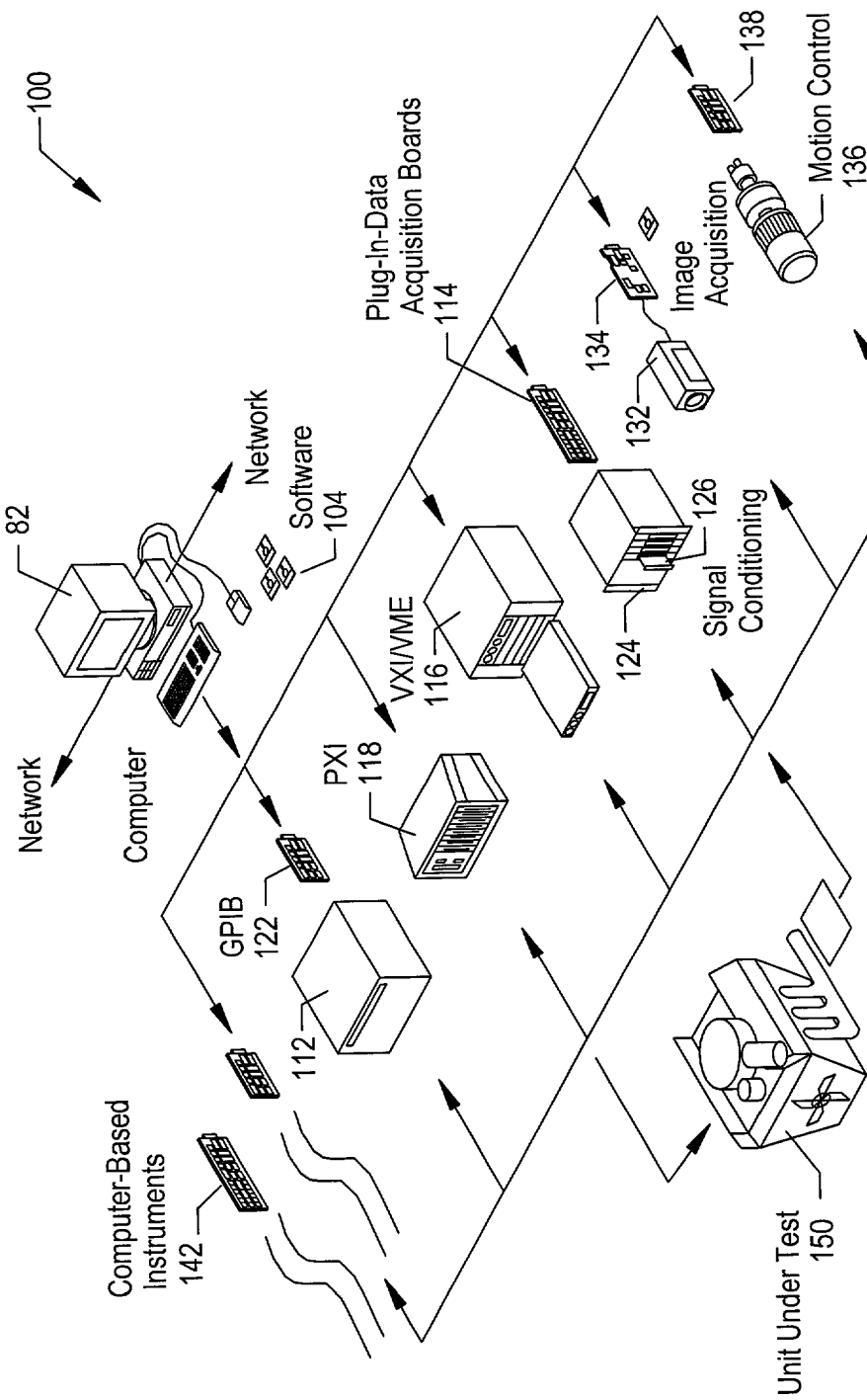
FIGS. 2A and 2B illustrate representative instrumentation and process control systems including various I/O interface options.
Figure 2B:
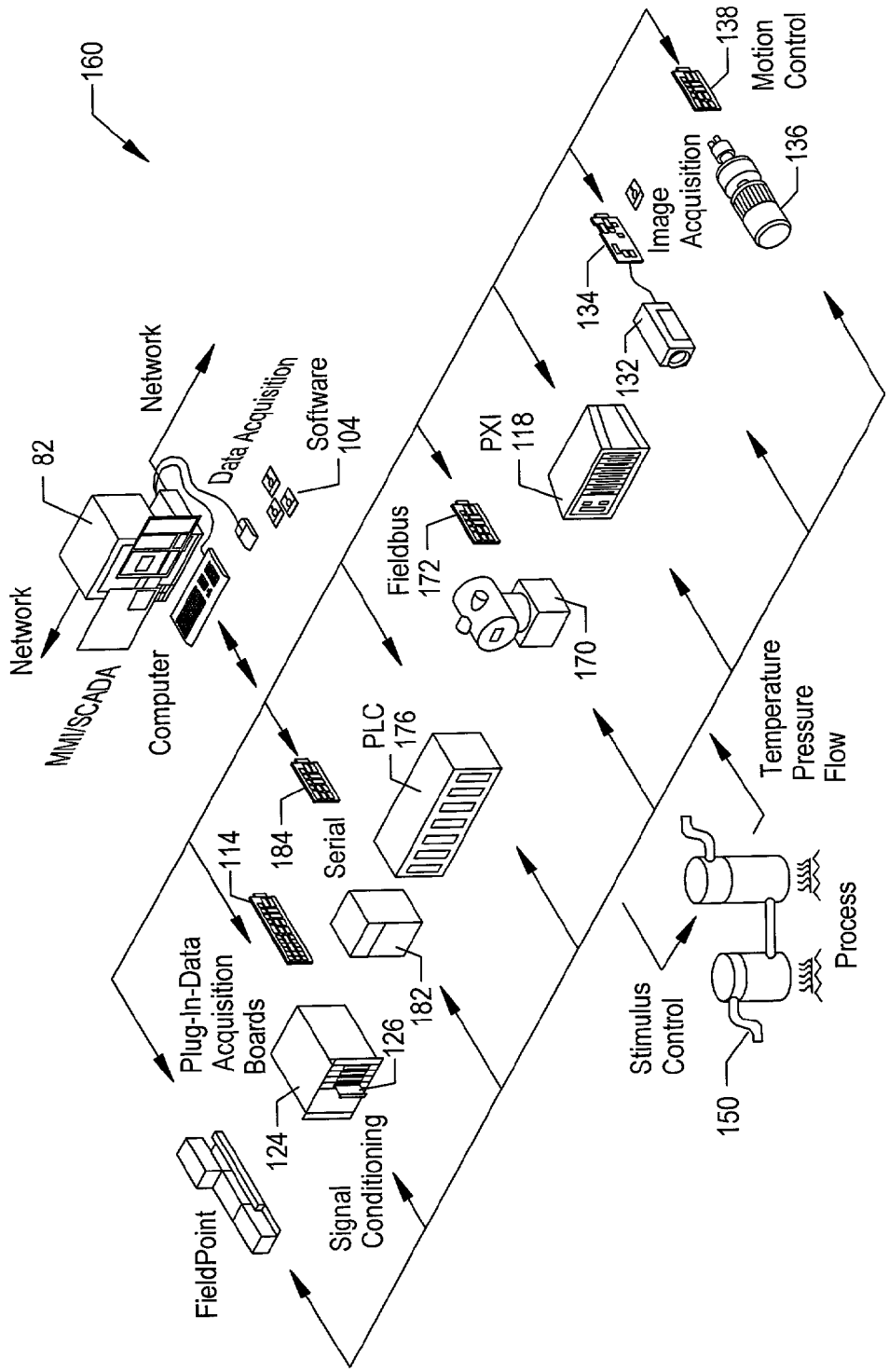

FIGS. 2A and 2B—Instrumentation and Industrial Automation Systems

The following describes embodiments of the present invention involved with performing test and/or measurement functions and/or controlling and/or modeling instrumentation or industrial automation hardware. However, it is noted that the present invention can be used for a plethora of applications and are not limited to instrumentation or industrial automation applications. In other words, the following description is exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, games, etc.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may execute a graphical program operable to interface with the one or more instruments to analyze, measure or control a unit under test (UUT) or process 150.

In one embodiment, the graphical program that interfaces with the one or more instruments may include one or more nodes that were suggested to the user by a graphical programming development environment, e.g., in response to nodes the user had previously included in the graphical program. As one example, suppose that the graphical program utilizes the Virtual Instrument Software Architecture (VISA), a standard for configuring, programming and troubleshooting instrumentation systems comprised of VXI, VME, PXI, GPIB, and/or serial interfaces. The user may include in the graphical program a VISA Open node for opening a session to a specified device and returning a session identifier for calling other operations of that device. In this case, the graphical programming development environment may automatically suggest a VISA Close node for inclusion in the graphical program, to close the session identifier returned by the VISA Open node.

The one or more instruments of the instrumentation control system 100 may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices.

The GPIB instrument 112 may be coupled to the computer 82 via the GPIB interface card 122 provided by the computer 82. In a similar manner, the video device 132 may be coupled to the computer 82 via the image acquisition card 134, and the motion control device 136 may be coupled to the computer 82 through the motion control interface card 138. The data acquisition board 114 may be coupled to the computer 82, and may interface through signal conditioning circuitry 124 to the UUT. The signal conditioning circuitry 124 may comprise an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 82, such as a PCI bus slot, a PC Card slot, or an ISA, EISA or MicroChannel bus slot provided by the computer 82. However, these cards 122, 134, 138 and 114 are shown external to computer 82 for illustrative purposes. These devices may also be connected to the computer 82 through a serial bus or through other means.

The VXI chassis or instrument 116 may be coupled to the computer 82 via a VXI bus, MXI bus, or other serial or parallel bus provided by the computer 82. The computer 82 may include VXI interface logic, such as a VXI, MXI or GPIB interface card (not shown), which interfaces to the VXI chassis 116. The PXI chassis or instrument may be coupled to the computer 82 through the computer's PCI bus.

A serial instrument (not shown) may also be coupled to the computer 82 through a serial port, such as an RS-232 port, USB (Universal Serial bus) or IEEE 1394 or 1394.2 bus, provided by the computer 82. In typical instrumentation control systems an instrument will not be present of each interface type, and in fact many systems may only have one or more instruments of a single interface type, such as only GPIB instruments.

The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown.

The computer 82 may execute a graphical program for operating with the one or more devices to interact with a process or device 150 to perform an automation function, such as MMI (Man Machine Interface), SCADA (Supervisory Control and Data Acquisition), portable or distributed data acquisition, process control, advanced analysis, or other control. In one embodiment, the graphical program that operates with the one or more devices may include one or more nodes that were suggested to the user by a graphical programming development environment, similarly as described above with reference to FIG. 2A.

The one or more devices of the industrial automation system 160 may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 134 may be connected to the computer 82 as described above. The serial instrument 182 may be coupled to the computer 82 through a serial interface card 184, or through a serial port, such as an RS-232 port, provided by the computer 82. The PLC 176 may couple to the computer 82 through a serial port, Ethernet port, or a proprietary interface. The fieldbus interface card 172 may be comprised in the computer 82 and may interface through a fieldbus network to one or more fieldbus devices. Each of the DAQ card 114, the serial card 184, the fieldbus card 172, the image acquisition card 134, and the motion control card 138 are typically plugged in to an I/O slot in the computer 82 as described above. However, these cards 114, 184, 172, 134, and 138 are shown external to computer 82 for illustrative purposes. In typical industrial automation systems a device will not be present of each interface type, and in fact many systems may only have one or more devices of a single interface type, such as only PLCs. The devices may be coupled to the device or process 150.

As used herein, the term "instrument" is intended to include any of the devices that are adapted to be connected to a computer system as shown in FIGS. 2A and 2B, traditional "stand-alone" instruments, as well as other types of measurement and control devices. The term "measurement function" may include any type of data acquisition, measurement or control function, such as that implemented by the instruments shown in FIGS. 2A and 2B. For example, the term "measurement function" includes acquisition and/or processing of an image. As described below, a graphical program may be created that implements a measurement function. For example, the graphical program may be used to acquire a signal and perform the measurement function on the acquired signal.

In the embodiments of FIGS. 2A and 2B above, one or more of the various instruments may couple to the computer 82 over a network, such as the Internet. In one embodiment, the user operates to select a target instrument or device from a plurality of possible target devices for programming or configuration according to the present invention. Thus the user may create a graphical program on a computer and use the graphical program in conjunction with a target device or instrument that is remotely located from the computer and coupled to the computer through a network.

Graphical software programs which perform data acquisition, analysis and/or presentation, e.g., for measurement, instrumentation control, industrial automation, or simulation, such as in the applications shown in FIGS. 2A and 2B, may be referred to as virtual instruments.

Figure 3:
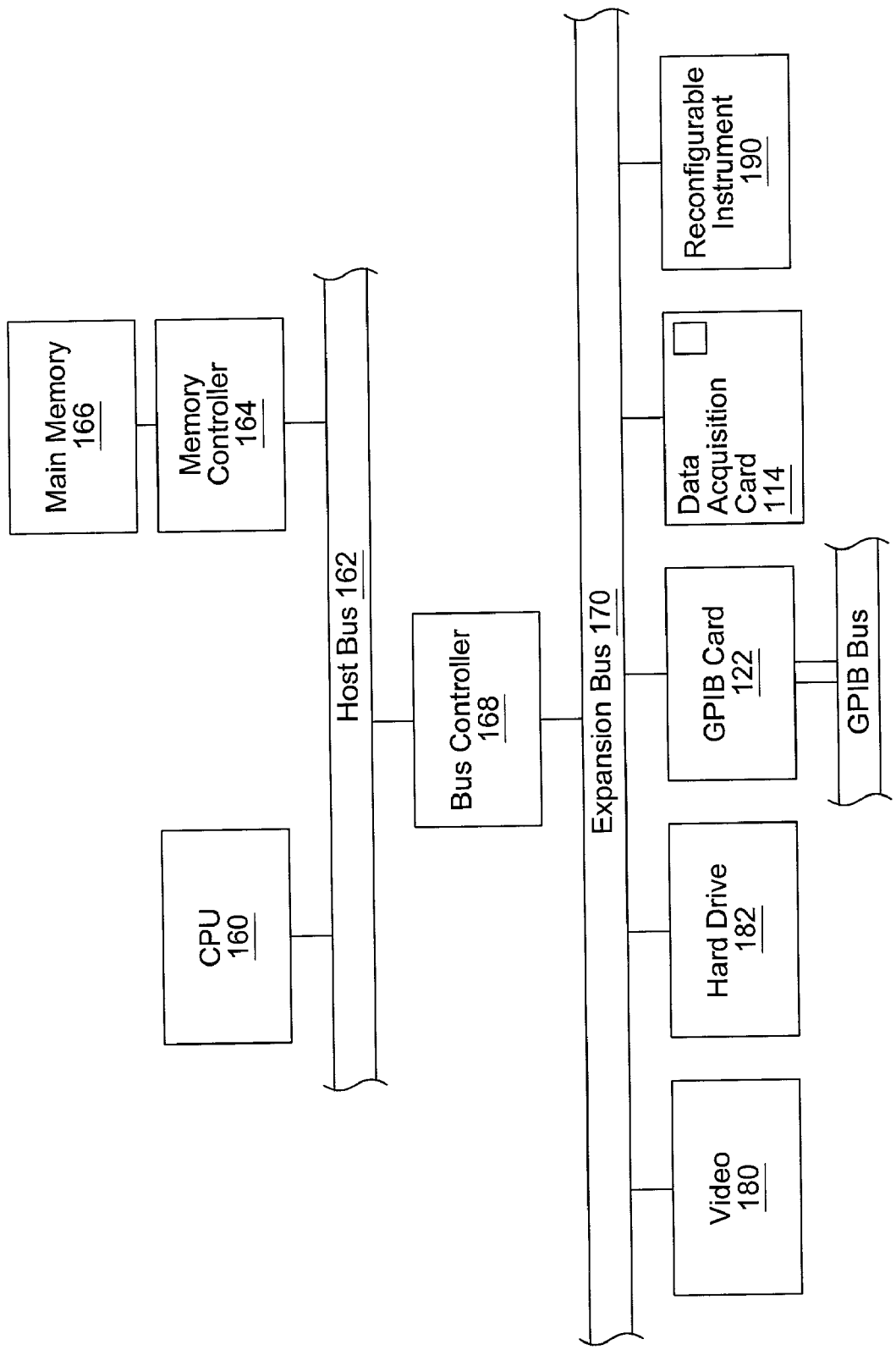
FIG. 3 is an exemplary block diagram of the computer systems of FIGS. 1, 2A, and 2B.

FIG. 3—Computer System Block Diagram

FIG. 3 is a block diagram representing one embodiment of the computer system 82 illustrated in FIGS. 1, 2A, and/or 2B. It is noted that any type of computer system configuration or architecture can be used as desired, and FIG. 3 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present description have been omitted for simplicity.

The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. The main memory 166 may store a graphical programming development environment application operable to provide suggested graphical programming operations, as described in detail below. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as a data acquisition board 114 and a GPIB interface card 122 which provides a GPIB bus interface to a GPIB instrument. The computer 82 further comprises a video display subsystem 180 and hard drive 182 coupled to the expansion bus 170.

A reconfigurable instrument 190 may also be connected to the computer. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114.

Figure 4:
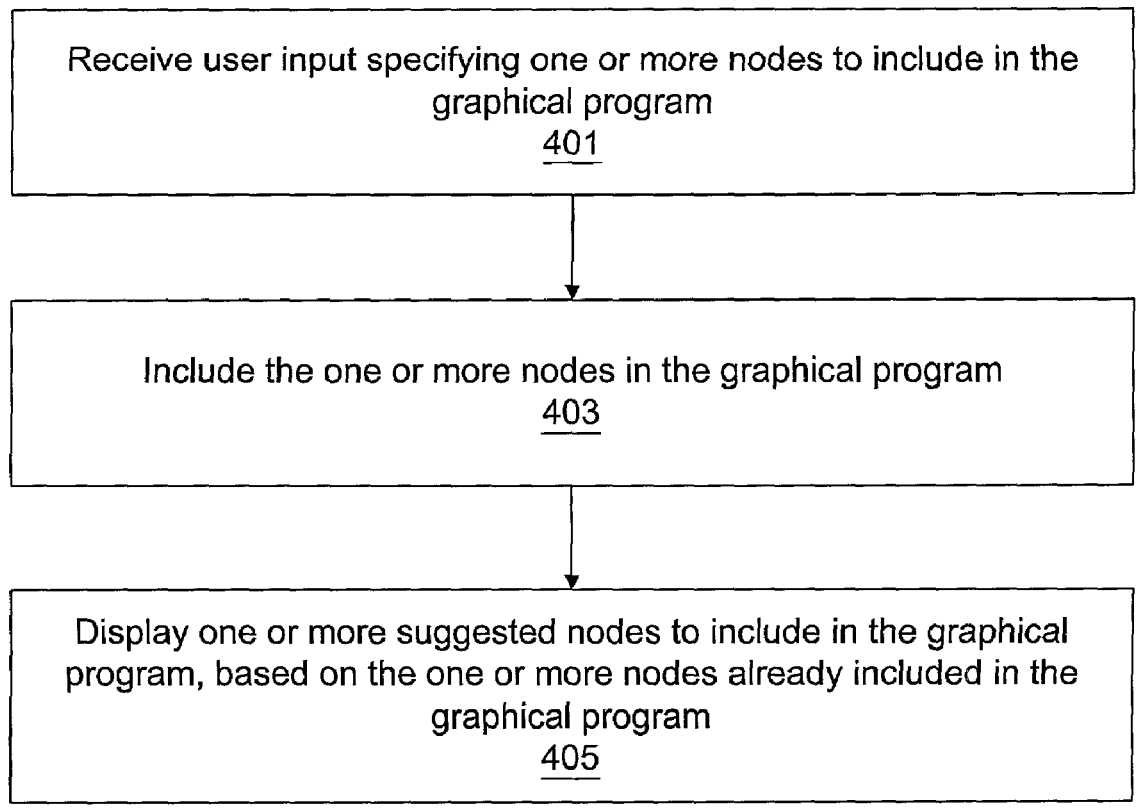
FIG. 4 is a flowchart diagram illustrating one embodiment of a method for creating a graphical program, in which one or more nodes of the graphical program are automatically suggested for inclusion in the graphical program.

FIG. 4—Creating a Graphical Program

FIG. 4 is a flowchart diagram illustrating one embodiment of a method for creating a graphical program, in which one or more nodes of the graphical program are automatically suggested for inclusion in the graphical program. It is noted that FIG. 4 represents an exemplary embodiment, and various alternative embodiments are contemplated. Also, the steps of FIG. 4 may be performed in various orders or multiple times, and steps may be combined, added, or omitted, etc.

In creating the graphical program, the user may interact with a graphical programming development environment. The graphical program may be created or assembled by the user arranging on a display a plurality of nodes or icons and then interconnecting the nodes to create the graphical program. The nodes or icons may be selected for inclusion in the graphical program in various ways. For example, the graphical programming development environment may provide various palettes for choosing the desired nodes and dragging and dropping them into the graphical program, or the graphical programming development environment may provide various menu options for specifying inclusion of the desired nodes in the graphical program, etc.

The nodes included in the graphical program may be interconnected in one or more of a data flow, control flow, and/or execution flow format. The graphical program may thus comprise a plurality of interconnected nodes or icons that visually indicate the functionality of the graphical program. In response to the user assembling the graphical program, data structures may be created and stored which represent the graphical program.

As described above, the graphical program may also include a graphical user interface portion or front panel. Where the graphical program includes a graphical user interface portion, the user may assemble the graphical user interface on the display, e.g., by arranging various user interface elements on the display, such as controls and indicators for providing input to and displaying output of the graphical program.

In various embodiments, the graphical program may perform any function or application. In one embodiment, the graphical program may implement a measurement or instrumentation function such as described above with reference to FIGS. 2A and 2B.

According to one embodiment of the method, in step 401, user input specifying one or more nodes to include in the graphical program may be received. For example, as described above, the user may select the one or more nodes from a visual palette that displays a plurality of available nodes, the user may utilize menu or keyboard commands to include the one or more nodes, etc.

In step 403, the one or more nodes specified in step 401 may be included in the graphical program.

In step 405, one or more suggested nodes to include in the graphical program may be automatically displayed or otherwise suggested to the user. As described below, the one or more suggested nodes may be based on the nodes already included in the graphical program. In various embodiments, the one or more suggested nodes may be displayed or otherwise suggested in any of various ways.

In one embodiment, the suggested node(s) may be displayed on a "suggestion palette". For example, the user may then include a suggested node in the graphical program by dragging the suggested node from the suggestion palette and dropping it into the graphical program. The graphical programming development environment may also provide other palettes for selecting nodes for inclusion in the graphical program. For example, all the available nodes may be organized on these other palettes according to their functionality, such as in the LabVIEW graphical programming development environment. The suggestion palette may be separate from these other palettes and may be easily accessible to the user. For example, the suggestion palette may always be displayed, allowing the user to immediately access the suggested node(s), whereas to access other palettes, the user may need to navigate through a hierarchy of palettes or may need to explicitly request display of the desired palette.

Any of various methods may be used in determining how many suggested node(s) are displayed on the suggestion palette and how long the nodes are displayed there. For example, in one embodiment, after the user has included a pre-determined number of additional nodes in the graphical program without selecting a suggested node, the suggested node may be removed from the suggestion palette. In another embodiment, after a pre-determined time interval has elapsed without the user selecting a suggested node, the suggested node may be removed from the suggestion palette.

In one embodiment, suggested nodes may be cumulatively added to the suggestion palette. For example, in response to the user including a first node in the graphical program, a second node may be displayed on the suggestion palette. The user may then include a third node in the graphical program, and in response, a fourth node may be displayed on the suggestion palette, along with the second node. In another embodiment, the suggested nodes may not be cumulatively displayed, and the fourth node may replace the second node.

In alternative embodiments, the one or more suggested nodes may not be displayed on a suggestion palette, but may be otherwise displayed or indicated to the user. In one embodiment, the suggested node(s) may be displayed in the block diagram of the graphical program. In one embodiment, the suggested node(s) may appear as "shadow nodes" that follow the cursor as the user moves the cursor around the block diagram. The user may then move the cursor to a desired position within the graphical program to drop the suggested node(s), e.g., by performing a mouse click or a keyboard command. If the user does not want to include the suggested node(s) in the graphical program, then the user may dismiss the shadow node(s) by performing a different mouse operation or a different keyboard command. The shadow node(s) may be displayed differently from how they normally appear, to indicate to the user that they are suggested nodes. For example, the shadow node(s) may be grayed out or displayed sem-transparently. Once the user drops the shadow node(s) in the graphical program, the node(s) may be displayed normally.

In various other embodiments, the suggested node(s) may be displayed in any of various other ways or may be indicated to the user using a technique other than display of the suggested node(s). For example, the user may receive audio suggestions indicating the suggested node(s) and may then perform a mouse or keyboard operation to include the suggested node(s) in the graphical program if desired. In another embodiment, the suggested node(s) may be automatically included in the graphical program, and the user may undo their inclusion if desired, e.g., by performing a mouse or keyboard operation.

In various embodiments, the one or more suggested nodes may be determined using any of various algorithms, heuristics, or other techniques. In one embodiment, a node to suggest in response to another node may be pre-determined, and this behavior may be programmed into the graphical programming development environment. For example, consider the VISA Open node described above. Inclusion of a VISA Open node in a graphical program is almost always followed by inclusion of a VISA Close node, to close the device session opened by the VISA Open node. Thus, the graphical programming development environment may be programmed to always suggest a VISA Close node in response to inclusion of a VISA Open node. As similar examples, a Close File node may be suggested in response to an Open File node, a Close Registry Key may be suggested in response to an Open Registry Key node, etc. In other words, when a first node requires one or more additional nodes to complete or clean up an operation performed by the first node, the one or more additional nodes may be suggested in response to inclusion of the first node.

In another embodiment, the graphical programming development environment may use other algorithms or heuristics for determining suggested nodes, such as artificial intelligence or statistical techniques. For example, the graphical programming development environment may be operable to analyze existing graphical programs to determine which nodes typically occur together in programs. Also, the graphical programming development environment may be operable to interactively "learn" which nodes the user usually includes in a graphical program together, by tracking included nodes as the user develops multiple graphical programs over time. For example, the graphical programming development environment may determine that when the user includes a node to acquire data from a device, the user then typically includes a node to analyze the data and/or a node to display the data.

In another embodiment, the user may be able to specify desired suggestion behavior utilized by the graphical programming development environment. For example, the user may specify a pair of nodes that should always be present together. This may be useful, for example, for user-defined nodes, such as nodes representing sub-programs created by the user. Thus, the user may specify that when a first user-defined (or pre-defned) node has been included in a graphical program, a second user-defined (or pre-defned) node is automatically included or suggested.

In one embodiment, different methods for indicating the suggested nodes may be utilized, depending on the context of which node has been included. For example, consider a first pair of nodes, in which a first node always requires a second node to be present. In this case, in response to inclusion of the first node, the second node may appear as a shadow node. Now consider a second pair of nodes, in which a fourth node usually appears together in a graphical program with a third node. In this case, in response to inclusion of the third node, the fourth node may be displayed in a suggestion palette. It may be desirable to use the somewhat less-intrusive suggestion technique of displaying the fourth node in a suggestion palette, since it is not certain that the fourth node is required. In one embodiment, the user may be able to specify which suggestion method to use for which situations.

User Interface Suggestions

As described above, a graphical program may include a front panel or graphical user interface. The front panel or graphical user interface may include various types of user interface elements, such as controls to receive input to the graphical program and/or indicators to display output from the graphical program. Examples of user interface elements include buttons, check boxes, list boxes, graphs, menus, etc.

In one embodiment, a graphical programming development environment may be operable to suggest user interface elements for inclusion in the front panel or graphical user interface. The suggested user interface elements may be determined based on user interface elements that the user has already included in the graphical user interface. For example, the graphical programming development environment may be pre-programmed to suggest certain user interface elements in response to inclusion of certain other user interface elements, or the graphical programming development environment may be operable to "learn" which user interface elements to suggest, e.g., based on artificial intelligence techniques. Also, the user may be able to specify suggestion criteria, similarly as described above.

Figure 5:
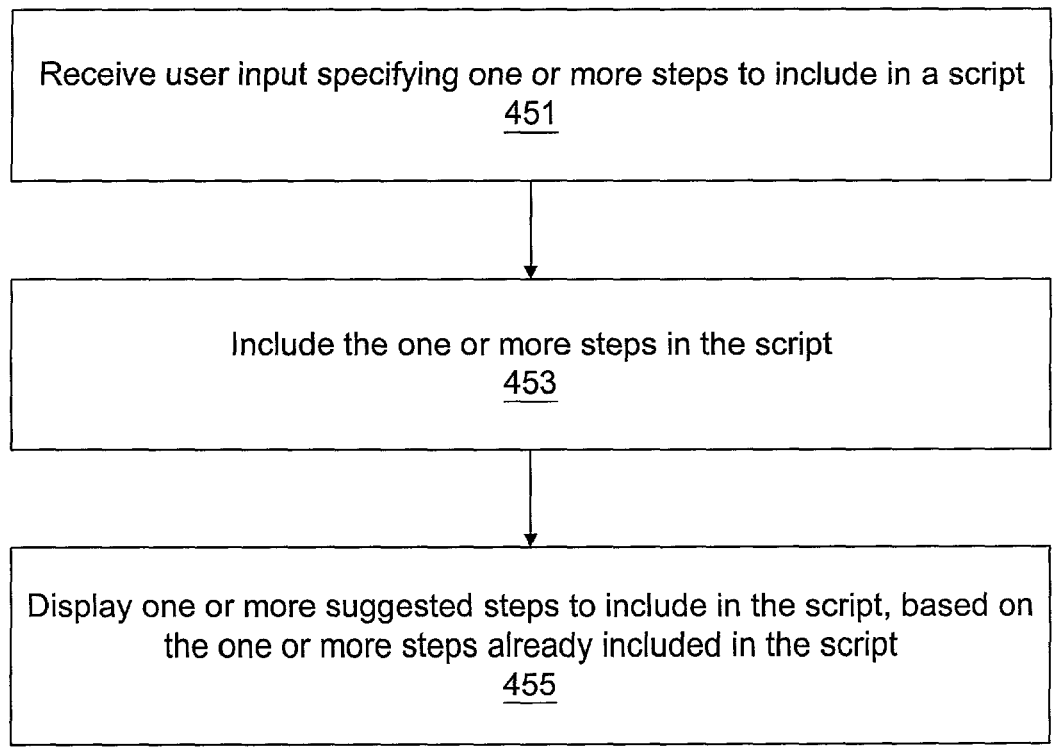
FIG. 5 is a flowchart diagram illustrating one embodiment of a method for suggesting steps for a script created using a prototyping environment or workshop application.

FIG. 5—Creating a Graphical Script

In various embodiments, the techniques described above may be applied to aid a user in developing other types of things besides graphical programs. For example, various prototyping environments or workshops allow a user to create a high-level algorithm or script. Prototyping environments or workshops may enable algorithms or scripts to be developed for any of various types of applications, such as image processing applications, motion control applications, test and measurement applications, etc. For example, the above-incorporated patent application titled, "System and Method for Automatically Generating a Graphical Program to Perform an Image Processing Algorithm" describes a prototyping environment for creating image processing scripts. Scripts may comprise a plurality of steps to perform a desired process. The steps may be represented graphically, e.g., as a plurality of icons, or textually, e.g., as a list.

FIG. 5 is a flowchart diagram illustrating one embodiment of a method for suggesting steps for a script created using a prototyping environment or workshop application. In step 451, user input specifying one or more steps to include in the script may be received. For example, the user may select the one or more steps from a visual palette that displays a plurality of available steps, the user may utilize menu or keyboard commands to include the one or more steps, etc.

In step 453, the one or more steps specified in step 451 may be included in the script.

In step 455, one or more suggested steps to include in the script may be automatically displayed or otherwise suggested to the user. The one or more suggested steps may be based on the steps already included in the script. In various embodiments, step 455 may be performed in various ways, similarly as described above with reference to the method of FIG. 4.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for creating a graphical program, the method comprising:
   receiving user input selecting one or more nodes to include in the graphical program from at least one first palette, wherein the at least one first palette presents a plurality of all available nodes for selection;
   including the one or more selected nodes in the graphical program; and
   displaying one or more suggested nodes to include in the graphical program in a second palette, based on the one or more nodes selected by the user input, wherein the second palette is separate from the at least one first palette, and wherein the one or more suggested nodes are selectable by the user for inclusion in the graphical program.

2. The method of claim 1,
   wherein the graphical program comprises a block diagram portion and a user interface portion.

3. The method of claim 1,
   wherein the graphical program comprises a graphical data flow program.

4. The method of claim 1, further comprising:
   interconnecting nodes included in the graphical program to visually indicate functionality of the graphical program.

5. The method of claim 1,
   wherein said displaying the one or more suggested nodes comprises displaying the one or more suggested nodes as shadow nodes that follow a mouse cursor.

6. The method of claim 1, further comprising:
   receiving user input requesting to include a first suggested node in the graphical program; and
   including the first suggested node in the graphical program.

7. The method of claim 1, further comprising:
   automatically including the one or more suggested nodes in the graphical program.

8. The method of claim 1, further comprising:
   determining the one or more suggested nodes.

9. The method of claim 8,
   wherein said determining the one or more suggested nodes comprises determining that the one or more suggested nodes are necessary to complete an operation performed by the one or more nodes selected by the user input.

10. The method of claim 8,
    wherein said determining the one or more suggested nodes comprises performing an algorithm to determine the one or more suggested nodes based on the one or more nodes selected by the user input.

11. The method of claim 10,
wherein the algorithm is hard-coded to always determine the one or more suggested nodes in response to the one or more nodes selected by the user input.

12. The method of claim 10,
wherein the algorithm is operable to determine the one or more suggested nodes based on previously stored data regarding nodes that frequently occur in graphical programs along with the one or more nodes selected by the user input.

13. The method of claim 8,
wherein said determining the one or more suggested nodes comprises determining that the one or more suggested nodes frequently appear in graphical programs that include the one or more selected nodes.

14. The method of claim 8,
wherein said determining the one or more suggested nodes comprises performing an artificial intelligence heuristic to determine the one or more suggested nodes based on the one or more nodes selected by the user input.

15. The method of claim 1, further comprising:
receiving user input specifying suggestion criteria;
determining the one or more suggested nodes based on the one or more nodes selected by the user input and based on the suggestion criteria.

16. The method of claim 1,
wherein the graphical program is operable to perform one or more of:
an industrial automation function;
a process control function;
a test and measurement function.

17. A memory medium for creating a graphical program, the memory medium comprising program instructions executable to:
receive user input selecting one or more nodes to include in the graphical program from at least one first palette, wherein the at least one first palette presents a plurality of all available nodes for selection;
include the one or more selected nodes in the graphical program; and
displaying one or more suggested nodes to include in the graphical program in a second palette, based on the one or more nodes selected by the user input, wherein the second palette is separate from the at least one first palette, and wherein the one or more suggested nodes are selectable by the user for inclusion in the graphical program.

18. The memory medium of claim 17,
wherein the graphical program comprises a block diagram portion and a user interface portion.

19. The memory medium of claim 17,
wherein the graphical program comprises a graphical data flow program.

20. The memory medium of claim 17, further comprising program instructions executable to:
receive user input requesting to include a first suggested node in the graphical program; and
include the first suggested node in the graphical program.

21. The memory medium of claim 17, further comprising program instructions executable to:
automatically include the one or more suggested nodes in the graphical program.

22. The memory medium of claim 17, further comprising program instructions executable to:
determine the one or more suggested nodes.

23. The memory medium of claim 22,
wherein said determining the one or more suggested nodes comprises determining that the one or more suggested nodes are necessary to complete an operation performed by the one or more nodes selected by the user input.

24. The memory medium of claim 22,
wherein said determining the one or more suggested nodes comprises performing an algorithm to determine the one or more suggested nodes based on the one or more nodes selected by the user input.

25. The memory medium of claim 22,
wherein said determining the one or more suggested nodes comprises determining that the one or more suggested nodes frequently appear in graphical programs that include the one or more selected nodes.

26. The memory medium of claim 22,
wherein said determining the one or more suggested nodes comprises performing an artificial intelligence heuristic to determine the one or more suggested nodes based on the one or more nodes selected by the user input.

27. A system for creating a graphical program, the system comprising:
a memory medium storing program instructions;
a processor;
wherein the processor is operable to execute the program instructions to:
receive user input specifying one or more nodes to include in a graphical program from at least one first palette, wherein the at least one first palette presents a plurality of all available nodes for selection;
include the one or more selected nodes in the graphical program; and
display one or more suggested nodes to include in the graphical program in a second palette, based on the one or more nodes selected by the user input, wherein the second palette is separate from the at least one first palette, and wherein the one or more suggested nodes are selectable by the user for inclusion in the graphical program.

28. The system of claim 27, wherein the processor is further operable to execute the program instructions to:
receive user input requesting to include a first suggested node in the graphical program; and
include the first suggested node in the graphical program.

29. A computer-implemented method for creating a graphical program, the method comprising:
displaying a graphical programming window for creating a graphical program;
displaying one or more nodes in the window in response to user input selecting the one or more nodes from at least one first palette, wherein the at least one first palette presents a plurality of all available nodes for selection;
determining one or more suggested nodes in response to the user input; and
displaying the one or more suggested nodes in a second palette, wherein the second palette is separate from the at least one first palette, and wherein the one or more suggested nodes are selectable by the user for inclusion in the graphical program.

30. A computer-implemented method for creating a graphical user interface for a graphical program, the method comprising:
displaying a window for creating the graphical user interface for the graphical program;

displaying one or more user interface elements in the window in response to user input;

determining one or more suggested user interface elements in response to the user input; and displaying the one or more suggested user interface elements.

31. A computer-implemented method for creating a script, the method comprising:

receiving user input selecting one or more steps to include in the script from at least one first palette, wherein the at least one first palette presents a plurality of all available steps for selection;

including the one or more selected steps in the script; and displaying one or more suggested steps to include in the script in a second palette, based on the one or more steps selected by the user input, wherein the second palette is separate from the at least one first palette, and wherein the one or more suggested nodes are selectable by the user for inclusion in the graphical program.

32. The method of claim 31, wherein the steps comprise image processing steps;

wherein the script is operable to perform an image processing process.

33. A computer-implemented method for creating a graphical program, the method comprising:

receiving user input selecting one or more nodes to include in the graphical program from at least one first palette, wherein the at least one first palette presents a plurality of all available nodes for selection;

including the one or more selected nodes in the graphical program;

determining one or more suggested nodes to include in the graphical program, based on the one or more nodes selected by the user input; and displaying the one or more suggested nodes as shadow nodes that follow a mouse cursor, wherein the one or more suggested nodes are selectable by the user for inclusion in the graphical program.

34. A memory medium for creating a graphical program, the memory medium comprising program instructions executable to:

receive user input selecting one or more nodes to include in the graphical program from at least one first palette, wherein the at least one first palette presents a plurality of all available nodes for selection;

include the one or more selected nodes in the graphical program;

determine one or more suggested nodes to include in the graphical program, based on the one or more nodes selected by the user input; and display the one or more suggested nodes as shadow nodes that follow a mouse cursor, wherein the one or more suggested nodes are selectable by the user for inclusion in the graphical program.

35. A computer-implemented method for creating a graphical program, the method comprising:

receiving user input selecting one or more nodes to include in the graphical program from at least one first palette, wherein the at least one first palette presents a plurality of all available nodes for selection;

including the one or more selected nodes in the graphical program;

determining one or more suggested nodes to include in the graphical program, based on the one or more nodes selected by the user input; and providing audio suggestions indicating the one or more suggested nodes, wherein one or more suggested nodes are selectable by the user for inclusion in the graphical program.

36. A memory medium for creating a graphical program, the memory medium comprising program instructions executable to:

receive user input selecting one or more nodes to include in the graphical program from at least one first palette, wherein the at least one first palette presents a plurality of all available nodes for selection;

include the one or more selected nodes in the graphical program;

determine one or more suggested nodes to include in the graphical program, based on the one or more nodes selected by the user input; and provide audio suggestions indicating the one or more suggested nodes, wherein one or more suggested nodes are selectable by the user for inclusion in the graphical program.

37. A computer-implemented method for creating a graphical program, the method comprising:

receiving user input selecting one or more nodes to include in the graphical program from at least one first palette, wherein the at least one first palette presents a plurality of all available nodes for selection;

including the one or more selected nodes in the graphical program;

determining one or more suggested nodes to include in the graphical program, based on the one or more nodes selected by the user input; and including the one or more suggested nodes in the graphical program, wherein the one or more suggested nodes are selectable by the user for removal from the graphical program.

38. A memory medium for creating a graphical program, the memory medium comprising program instructions executable to:

receiving user input selecting one or more nodes to include in the graphical program from at least one first palette, wherein the at least one first palette presents a plurality of all available nodes for selection;

including the one or more selected nodes in the graphical program;

determining one or more suggested nodes to include in the graphical program, based on the one or more nodes selected by the user input; and including the one or more suggested nodes in the graphical program, wherein the one or more suggested nodes are selectable by the user for removal from the graphical program.

39. A computer-implemented method for creating a graphical program, the method comprising:

receiving user input selecting one or more nodes to include in the graphical program from at least one first palette, wherein the at least one first palette presents a plurality of all available nodes for selection;

including the one or more selected nodes in the graphical program;

displaying one or more suggested nodes to include in the graphical program in a second palette, based on the one or more nodes selected by the user input, wherein the second palette is separate from the at least one first palette, and wherein the one or more suggested nodes are selectable by the user for inclusion in the graphical program;

displaying a window for creating a graphical user interface for the graphical program;

displaying one or more user interface elements in the window in response to user input;

determining one or more suggested user interface elements in response to the user input; and displaying the one or more suggested user interface elements, wherein the one or more suggested user interface elements are selectable by the user for inclusion in the graphical program.

40. A memory medium for creating a graphical program, the memory medium comprising program instructions executable to:

receive user input selecting one or more nodes to include in the graphical program from at least one first palette, wherein the at least one first palette presents a plurality of all available nodes for selection;

include the one or more selected nodes in the graphical program;

display one or more suggested nodes to include in the graphical program in a second palette, based on the one or more nodes selected by the user input, wherein the second palette is separate from the at least one first palette, and wherein the one or more suggested nodes are selectable by the user for inclusion in the graphical program;

display a window for creating a graphical user interface for the graphical program;

display one or more user interface elements in the window in response to user input;

determine one or more suggested user interface elements in response to the user input; and display the one or more suggested user interface elements, wherein the one or more suggested user interface elements are selectable by the user for inclusion in the graphical program.

41. A computer-implemented method for creating a graphical program, the method comprising:

receiving user input selecting one or more nodes to include in the graphical program from at least one first graphical user interface, wherein the at least one first graphical user interface presents a plurality of all available nodes for selection;

including the one or more selected nodes in the graphical program; and displaying one or more suggested nodes to include in the graphical program in a second graphical user interface, based on the one or more nodes selected by the user input, wherein the second graphical user interface is separate from the at least one first graphical user interface, and wherein the one or more suggested nodes are selectable by the user for inclusion in the graphical program.

42. The method of claim 41, wherein the at least one first graphical user interface and/or the second graphical user interface comprises one or more of:

a palette;
a menu;
buttons;
checkboxes;
a list box;
a graph; and
a shadow node display that follows a mouse cursor.

43. The method of claim 41, further comprising:

receiving user input requesting to include a first suggested node in the graphical program; and including the first suggested node in the graphical program.

44. The method of claim 41, further comprising:

automatically including the one or more suggested nodes in the graphical program.

45. The method of claim 41, further comprising:

determining the one or more suggested nodes.

46. The method of claim 45, wherein said determining the one or more suggested nodes comprises determining that the one or more suggested nodes are necessary to complete an operation performed by the one or more nodes selected by the user input.

47. The method of claim 45, wherein said determining the one or more suggested nodes comprises determining that the one or more suggested nodes frequently appear in graphical programs that include the one or more selected nodes.

48. The method of claim 45, wherein said determining the one or more suggested nodes comprises performing an artificial intelligence heuristic to determine the one or more suggested nodes based on the one or more nodes selected by the user input.

49. A memory medium for creating a graphical program, the memory medium comprising program instructions executable to:

receive user input selecting one or more nodes to include in the graphical program from at least one first graphical user interface, wherein the at least one first graphical user interface presents a plurality of all available nodes for selection;

include the one or more selected nodes in the graphical program; and display one or more suggested nodes to include in the graphical program in a second graphical user interface, based on the one or more nodes selected by the user input, wherein the second graphical user interface is separate from the at least one first graphical user interface, and wherein the one or more suggested nodes are selectable by the user for inclusion in the graphical program.

50. A computer-implemented method for creating a graphical program, the method comprising:

receiving user input selecting one or more nodes to include in the graphical program from at least one graphical user interface, wherein the at least one graphical user interface presents a plurality of all available nodes for selection;

including the one or more selected nodes in the graphical program; and displaying one or more suggested nodes to include in the graphical program in a palette, based on the one or more nodes selected by the user input, wherein the palette is separate from the at least one graphical user interface, and wherein the one or more suggested nodes are selectable by the user for inclusion in the graphical program.

* * * * *